INVENTOR.
FRANK T. TESSITORE
BY Bernard E. Franz
ATTY.

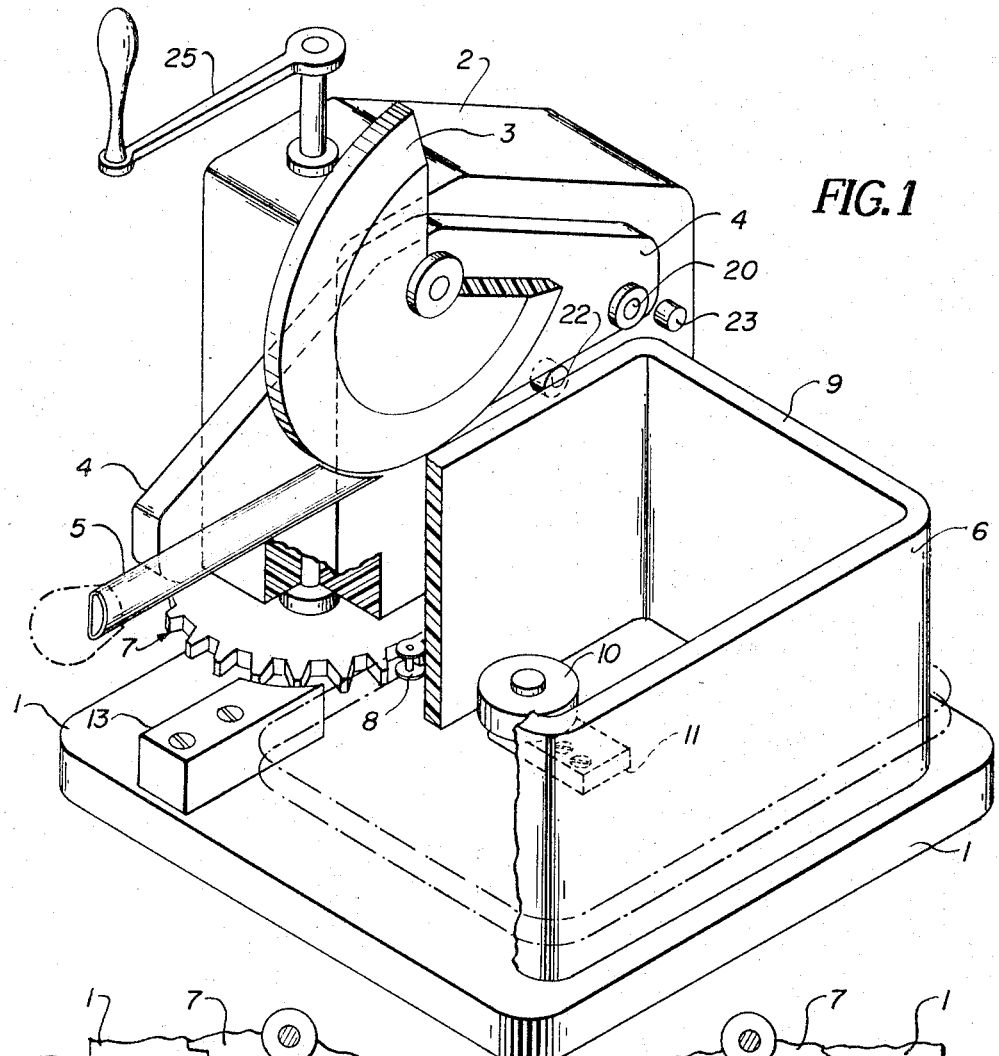
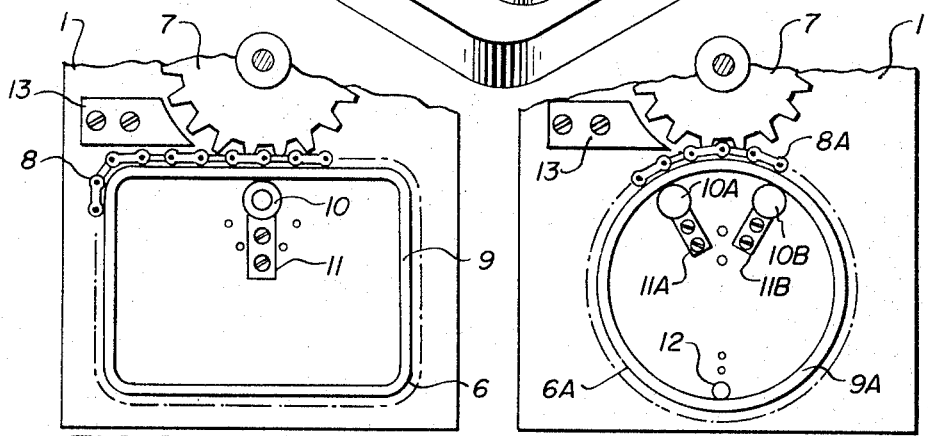
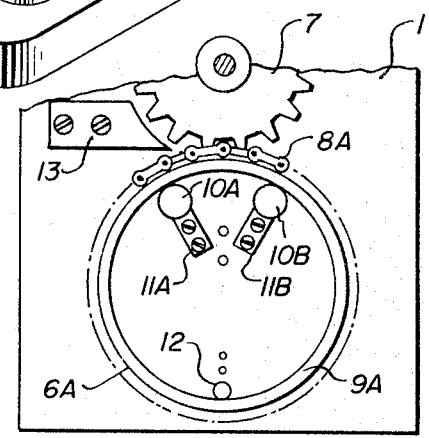

Feb. 20, 1968
F. T. TESSITORE
3,369,342
CONTAINER SEALING MACHINE
Filed May 6, 1965
3 Sheets-Sheet 3
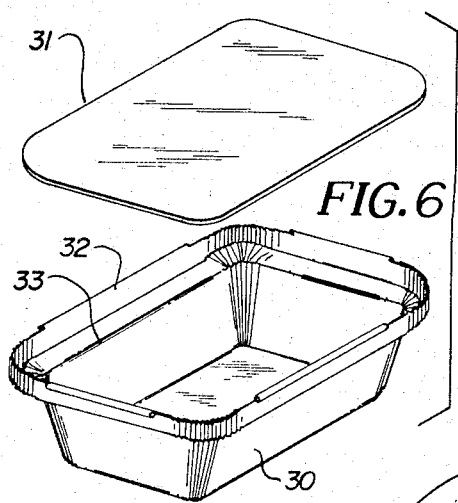
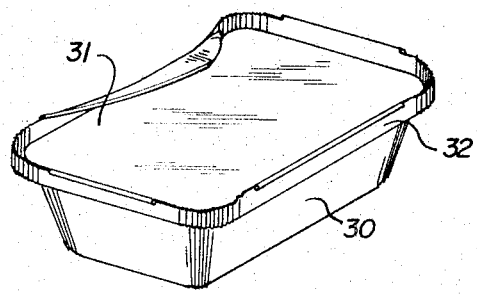
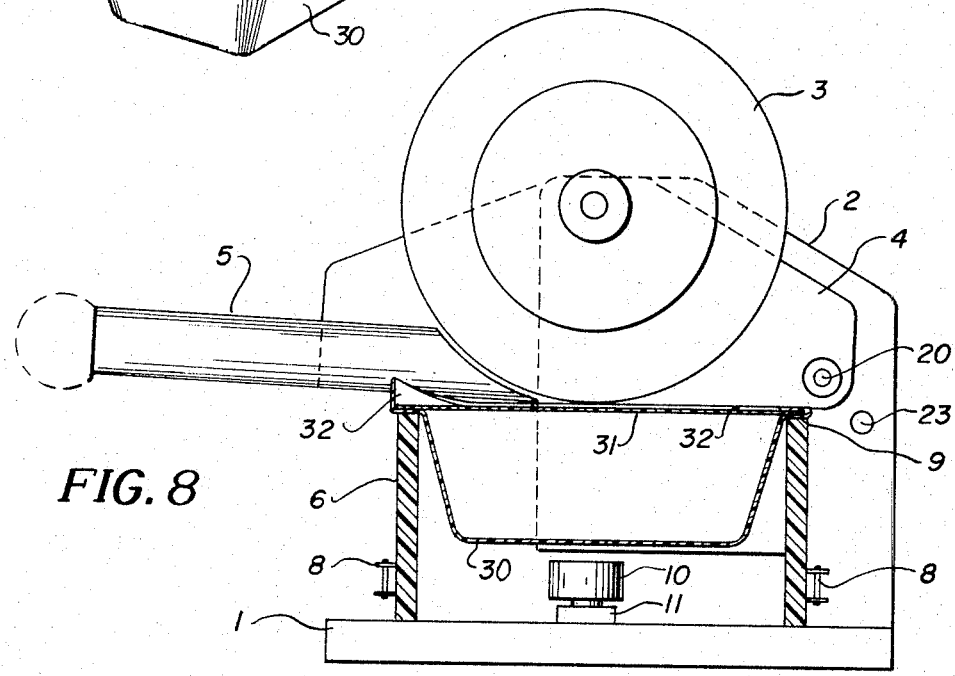
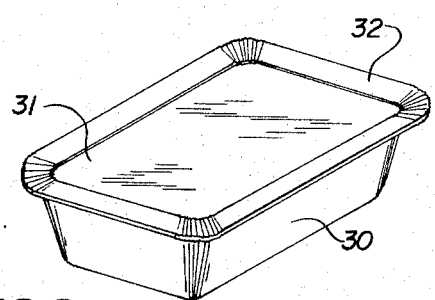
INVENTOR.
FRANK T. TESSITORE
BY Bernard E. Franz
ATTY.

United States Patent Office 3,369,342
Patented Feb. 20, 1968

3,369,342
CONTAINER SEALING MACHINE
Frank T. Tessitore, 7738 W. Hortense,
Chicago, Ill. 60631
Filed May 6, 1965, Ser. No. 453,606
5 Claims. (Cl. 53—366)

ABSTRACT OF THE DISCLOSURE

Machine for sealing the cover on one food pan at a time. A support device has a wall in which the pan is placed with the pan shoulder on the top edge of the wall. A pan lip is folded over the cover and shoulder and sealed by pressure between a roller and the support wall, as the support device is driven through one revolution.

---

This invention relates to a machine for closing containers, and more particularly, for use with a food container of the type having a shoulder and a lip integral with the shoulder which is closed by placing a cover on the shoulder, the invention relates to a machine to fold the lip over the cover and press it against the shoulder.

Many machines are known for closing food containers, but these are generally of a type for production line operation, or are in the nature of a press for sealing the container at all points simultaneously. Such machines are necessarily complex and expensive, and therefore unsuitable for use in small bakeries, catering firms and other small food processing plants, where the operation is now performed manually.

The object of the invention is to provide a simple, inexpensive machine for sealing the cover of only one container at a time.

According to the invention, a machine is provided having a container support device comprising a wall with an upper edge for receiving the container with the container's shoulder resting on the edge of the support, the cover being in place on the shoulder; and a pressure roller to press the lip over the cover rim.

The machine further includes a deflector to partially fold the lip over before it passes under the pressure roller.

The pressure roller and deflector may be mounted on a roller support member which may be pivoted to raise the roller off the container support device for insertion of the container, or to change the support device.

The above-mentioned and other objects and features of this invention and the manner of attaining them wlil become more apparent, and the invention itself will be best understood, by reference to the following description of the invention taken in conjunction with the accompanying drawings comprising FIGS. 1 to 9, wherein:

FIG. 1 is a perspective view of the machine;

FIGS. 2 and 3 are top views of a portion of the machine showing different container supports;

FIG. 6 shows a food container and cover;

FIG. 7 shows the cover in place resting on the shoulder of the container with the lip started over at one point;

FIG. 8 is a side view with the container support and container in cross section to show the container in place; and FIG. 9 shows the sealed container.

Figure 4:
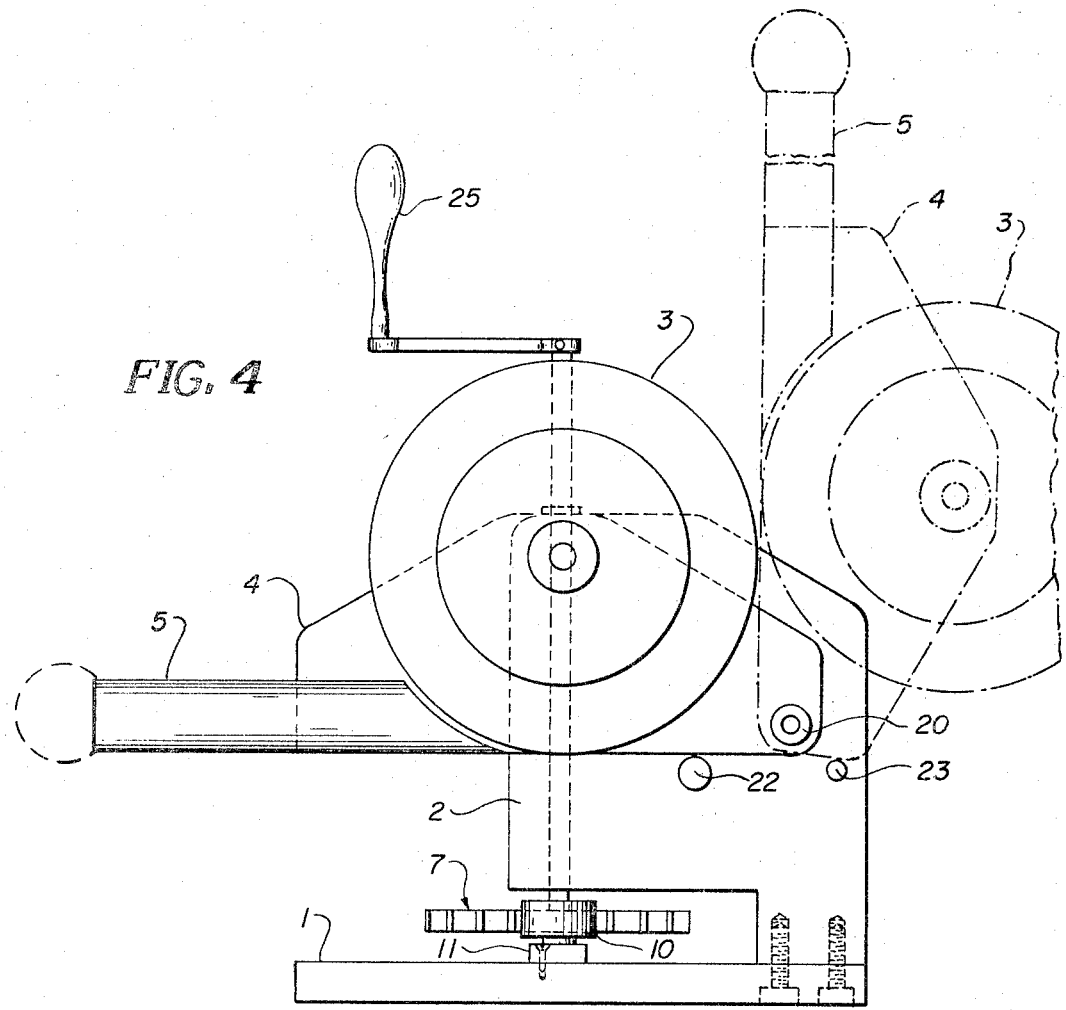
FIG. 4 is a side view showing how the roller support member may be raised and lowered.
Figure 5:
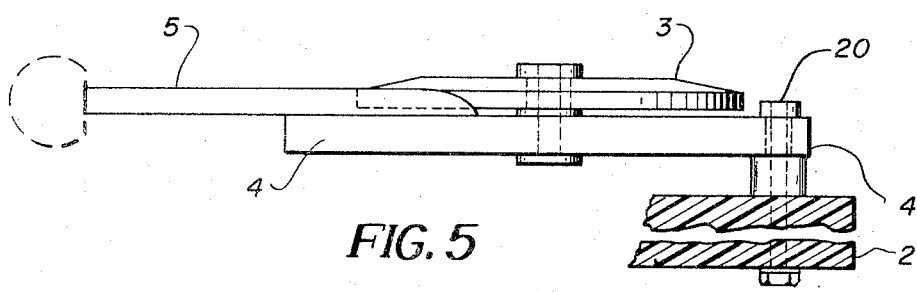
FIG. 5 is a bottom view of a portion of the machine taken along line 5—5 of FIG. 4.

Referring to FIG. 1, the mechanism comprises one base member 1, one body support member 2, a pressure roller 3, a roller support member 4, a handle and deflector 5, a pan (food container) support 6, and a drive wheel 7. A sprocket chain 8 is fastened around the outside of the wall of the pan support near the bottom to engage the spurs of the drive wheel 7. Other arrangements to drive the pan support will be readily apparent. For example, a row of holes could be cut into the face of the pan support whereby the walls of the recesses would function as the cogs to engage the spurs of the drive wheel 7, or a friction drive could be used between the drive wheel and the surface of the pan support wall.

The pan support is proportioned so that the upper edge 9 conforms to the size and shape of the shoulder of the pan to be sealed. Since pans come in various sizes and shapes, several pan supports may be provided. FIGS. 1 and 2 show a rectangular pan support 6, and FIG. 3 shows a circular pan support 6A. For rectangular pan supports a follower roller 10 on a follower roller mounting arm 11 attached to the base 1 holds the wall of the pan support against the drive wheel 7. For a circular pan support, the same follower roller may be used, or two members 10A and 10B on arms 11A and 11B respectively attached to the base may be used. An additional pin 12 in an appropriate one of a series of holes in the base may also be used with a circular pan support to aid in guiding it. For a rectangular pan support a guide stop 13 attached to the base 1 adjacent the drive wheel 7 with a face parallel and adjacent the wall of the pan support may be used to prevent overshoot as the pan support is turned about its corner when driven.

The deflector 5 may be of a semi-circular shape, so that its outer face is generally oval. The deflector is attached to the roller support member 4. This deflector is used to partially fold the lip of the pan before it passes under the pressure roller 3. It is also used as a handle to raise and lower the roller support member 4, and therefore may have a knob (not shown) on its end.

As shown in FIGS. 1 and 4, a pivot shaft 20 rotatably attaches the roller support member 4 to the body support member 2, as shown by dashed lines in FIG. 4, this permits the roller support member to be raised so that the pressure roller 3 is clear of the pan support 6. With no pan support in place, the roller support member 4 in its lower position rests on a pin 22 inserted into the body support member 2. In the raised position the roller support member rests on a pin 23.

The drive wheel 7 is shown mounted upon the lower extremity of an axial member 24 to which a crank arm 25 is attached at its upper extremity. The axial member is journalled in the support member 2. In operation the crank would be turned by hand in a counterclockwise direction.

FIG. 6 shows a food container 30 in the form of a rectangular pan, and a cover 31. This pan may be of the type disclosed in Patent No. 2,960,255, wherein the receptacle is formed from foil sheet material to define a marginal lip 32 about its open mouth and an internal shoulder 33 at the base of the lip. The receptacle has rectilinear side portions that merge into rounded corner portions. The cover 31 is proportioned so that its rim rests upon the shoulder 33, as shown in FIG. 7. The lip 32 is adapted to be flexed inwardly to overlie and abut against the rim of the cover to secure the cover to the receptacle, as shown at one point in FIG. 7. The completely closed pan is shown in FIG. 9.

In operation, the pan 30 is filled and the cover 31 placed on the shoulder 33. The lip 32 is then manually pressed against the cover rim, as shown in FIG. 7. The operator then grasps the deflector arm 5 and raises the roller 3 and its support member 4 as shown by the dashed lines in FIG. 4, and places the pan 30 in the support member 6 with the shoulder 33 resting on the edge 9, with the pre-sealed point in place for the pressure roller 3. The roller support member is then lowered so that the roller 3 rests on that point. The operator next turns the crank 25, so that the drive wheel 7 drives the sprocket chain 8 to move the wall of the pan support from left to right under the roller 3. The lip 32 as it comes into position under deflector 5 is partially folded. The pressure roller 3 completes the fold and presses the lip, cover rim and pan shoulder firmly together. The sealed pan is then removed from the machine, and appears as shown in FIG. 9.

If a pan of a different size or shape is to be sealed, the arm 11 may be loosened, the pan support 6 removed, and a pan support of the proper size and shape for the pan is inserted into the machine.

While I have described above the principles of my invention in connection with specific apparatus, it is to be clearly understood that this description is made only by way of example and not as a limitation to the scope of my invention.

What is claimed is:

1. Apparatus for use with a container of the type having a marginal lip about its mouth and an internal shoulder at the base of the lip, with a cover placed to rest upon the shoulder, the lip being adapted to be flexed inwardly to overlie and abut the rim of the cover to secure the cover to the container;

said apparatus comprising:

a base member;

a body support member rigidly attached to the base member;

a roller support member pivotally attached to the body support member;

a pressure roller having an axle attached to the roller support member;

a container support device comprising a wall with an upper edge of the size and shape of the container shoulder for receiving the container inside the wall with the shoulder resting on said edge, the support device being set on said base member;

drive means and means co-operating therewith to maintain only one side of the wall at a time in place under the pressure roller and to move the wall through a complete rotation under the pressure roller;

and a deflector arm attached to said roller support member adjacent said pressure roller;

said machine so constructed and arranged that the roller support member along with the pressure roller may be raised, a container having a cover in place with the lip at one point pressed over the rim of the cover on the shoulder may be placed in the support device with the shoulder on said upper edge, the roller support device may be lowered so that the pressure roller rests on said one point, and actuation of the drive means moves the support device wall so that the deflector partially folds the lip and the pressure roller acting against the upper edge of the wall presses the lip, cover rim, and shoulder together.

2. Apparatus for use with a container of the type having a marginal lip about its mouth and an internal shoulder at the base of the lip, with a cover placed to rest upon the shoulder, the lip being adapted to be flexed inwardly to overlie and abut the rim of the cover to secure the cover to the container;

said apparatus comprising:

a base member;

a body support member rigidly attached to the base member;

a roller support member pivotally attached to the body support member;

a pressure roller having an axle attached to the roller support member;

a container support device comprising a wall with an upper edge of the size and shape of the container shoulder for receiving the container inside the wall with the shoulder resting on said edge, the support device being set on said base member;

drive means comprising a sprocket chain rigidly mounted on the wall of the support device, a drive wheel with the spurs engaging the chain sprockets, and means to rotate the drive wheel;

a follower roller and means attaching it to said base member on the opposite side of said wall from said drive wheel to maintain the wall in place under the pressure roller;

and a deflector arm attached to said roller support member adjacent said pressure roller;

said machine so constructed and arranged that the roller support member along with the pressure roller may be raised, a container having a cover in place with the lip at one point pressed over the rim of the cover on the shoulder may be placed in the support device with the shoulder on said upper edge, the roller support device may be lowered so that the pressure roller rests on said one point, and actuation of the drive means moves the support device wall so that the deflector partially folds the lip and the pressure roller acting against the upper edge of the wall presses the lip, cover rim, and shoulder together.

3. Apparatus according to claim 2, adapted for use with containers having different sizes and shapes at the shoulder, by provision of a plurality of said support devices, each having a wall with an upper edge for a particular size and shape of shoulder, only one support device at a time being used.

4. Apparatus according to claim 3, wherein at least one of said support devices is shaped for containers having rectilinear side portions that merge into rounded corner portions.

5. Apparatus according to claim 2, further including a guide member mounted on said base member to guide the wall of the support member in its movement toward said pressure roller.

References Cited

UNITED STATES PATENTS

| | | | |
|---|---|---|---|
| 2,767,537 | 10/1956 | Prince et al. | 53—366 |
| 2,845,765 | 8/1958 | Doherty | 53—366 |
| 2,982,073 | 5/1961 | Zimmerer | 53—366 |
| 3,263,393 | 9/1966 | Weber | 53—266 X |

WILLIAM W. DYER, JR., *Primary Examiner.*

R. L. FARRIS, *Assistant Examiner.*